(12) United States Patent
Manning et al.

(10) Patent No.: US 8,529,665 B2
(45) Date of Patent: Sep. 10, 2013

(54) SYSTEMS AND METHODS FOR GAS SEPARATION USING HIGH-SPEED INDUCTION MOTORS WITH CENTRIFUGAL COMPRESSORS

(75) Inventors: Michael S. Manning, Buffalo, NY (US); Andrew C. Rosinski, Orchard Park, NY (US); Gerald Thomas O'Connor, West Seneca, NY (US); Paul William Belanger, Clarence Center, NY (US)

(73) Assignee: Praxair Technology, Inc., Danbury, CT (US)

( * ) Notice: Subject to any disclaimer, the term of this patent is extended or adjusted under 35 U.S.C. 154(b) by 591 days.

(21) Appl. No.: 12/778,379

(22) Filed: May 12, 2010

(65) Prior Publication Data
US 2011/0277629 A1 Nov. 17, 2011

(51) Int. Cl.
*B01D 59/26* (2006.01)

(52) U.S. Cl.
USPC .................................. 95/96; 95/148; 96/130

(58) Field of Classification Search
USPC ........................................ 95/96, 148; 96/130
See application file for complete search history.

(56) References Cited

U.S. PATENT DOCUMENTS

| | | | |
|---|---|---|---|
| 275,114 A | 4/1883 | Appleby | |
| 4,197,096 A | 4/1980 | Sebastian et al. | |
| 4,867,766 A | 9/1989 | Campbell et al. | |
| 4,893,479 A | 1/1990 | Gillett et al. | |
| 5,110,264 A | 5/1992 | Murry | |
| 5,123,080 A | 6/1992 | Gillett et al. | |
| 5,203,889 A | 4/1993 | Brown | |
| 5,214,367 A | 5/1993 | Uesugi | |
| RE34,434 E | 11/1993 | Campbell et al. | |
| 5,258,056 A | 11/1993 | Shirley et al. | |
| 5,393,326 A | 2/1995 | Engler et al. | |
| 5,555,749 A | 9/1996 | Wehrman et al. | |
| 5,656,068 A | 8/1997 | Smolarek et al. | |
| 5,730,778 A | 3/1998 | Hill et al. | |
| 5,924,847 A | 7/1999 | Scaringe et al. | |
| 6,010,555 A | 1/2000 | Smolarek et al. | |
| 6,273,936 B1 | 8/2001 | Barry et al. | |
| 6,398,517 B1 | 6/2002 | Choi | |
| 6,579,078 B2 | 6/2003 | Hill et al. | |
| 6,691,702 B2 | 2/2004 | Appel et al. | |
| 6,698,929 B2 | 3/2004 | Choi et al. | |
| 7,396,387 B2 | 7/2008 | Baksh et al. | |
| 7,402,287 B2 | 7/2008 | Wheat et al. | |

(Continued)

FOREIGN PATENT DOCUMENTS

| | | |
|---|---|---|
| EP | 0 745 419 A2 | 12/1996 |
| GB | 2003742 A | 3/1979 |
| JP | 2002210320 A * | 7/2002 |

OTHER PUBLICATIONS

Abdelwahab, "Design of a Moderate Speed-High Capacity Centrifugal Compressor with Application to PSA and VPSA Air Separation Processes", pp. 1-8, Proceedings of PWR2005, ASME Power, Apr. 5-7, 2005, Chicago, IL USA.

(Continued)

*Primary Examiner* — Robert A Hopkins
(74) *Attorney, Agent, or Firm* — Salvatore P. Pace

(57) ABSTRACT

Systems and processes are provided for gas separation using high-speed induction variable-speed motors to accelerate and decelerate centrifugal compressors suitable for use in pressure swing adsorption (PSA) or vacuum pressure swing adsorption (VPSA) processes.

38 Claims, 11 Drawing Sheets

(56) References Cited

U.S. PATENT DOCUMENTS

| | | | |
|---|---|---|---|
| 7,785,405 | B2 | 8/2010 | Manning et al. |
| 7,892,304 | B2 * | 2/2011 | Hajiaghajani ............... 48/197 R |
| 2005/0158172 | A1 * | 7/2005 | Snyder et al. ................ 415/206 |
| 2006/0275114 | A1 | 12/2006 | Mangnall et al. |
| 2007/0189905 | A1 | 8/2007 | Dinsdale et al. |
| 2008/0005964 | A1 | 1/2008 | Hajiaghajani |
| 2008/0006151 | A1 | 1/2008 | Baksh et al. |

OTHER PUBLICATIONS

Beer, et al., "High-Speed Motor Design for Gas Compressor Applications" pp. 103-112, Proceedings of the Thirty-Fifth Turbomachinery Symposium (2006).

Rodrigues, et al., "Design of high-speed induction motors and associate inverter for direct drive of centrifugal machines", Proceedings of the 2008 International Conference on Electrical Machines, Paper ID 1459, pp. 1-5 (2008).

* cited by examiner

PRIOR ART

SYSTEMS AND METHODS FOR GAS SEPARATION USING HIGH-SPEED INDUCTION MOTORS WITH CENTRIFUGAL COMPRESSORS

TECHNICAL FIELD

The present invention generally relates to gas separation processes and systems using high-speed induction motors. More specifically, this invention is directed to the use of induction motors with variable-frequency motor speed control and centrifugal compressors to pressurize and/or evacuate adsorbent vessels within an adsorption type gas separation systems.

BACKGROUND OF THE INVENTION

Separations of a gas from admixture with other gases are important industrial processes. In such processes the objective may be either to obtain a product gas enhanced in a particular gas or from which that particular product gas has an undesired constituent removed therefrom. For example, there are commercial scale processes to separate air into its component gases to obtain nitrogen, oxygen, and argon and for air prepurification processes to pretreat the air prior to use in other processes such as the cryogenic separation of air into its component gases.

More specifically, air separation can be accomplished using adsorption processes, in particular, pressure swing adsorption (PSA) and vacuum pressure swing adsorption (VPSA) type processes. In PSA and VPSA processes, compressed air is pumped through a fixed bed of an adsorbent exhibiting an adsorptive preference for one of the main constituents whereby an effluent product stream enhanced in the non-adsorbed (or lesser adsorbed) constituent is obtained. Compared to more traditional cryogenic air separation processes, adsorption processes for air separation require relatively simple equipment and are relatively easy to maintain. Adsorption processes, however, typically have lower product recovery than many cryogenic processes. For this reason, improvements in the efficiency of adsorption processes remain an important goal. One principal means of improvement is the discovery and development of better adsorbents. Some such adsorbents have led to reduced cycle times within a given adsorption process. According, new equipment capable of meeting the demands of reduced cycle times are required.

There also continues to be a demand for PSA and VPSA plants with lower power consumption. The basic process employs a selective adsorbent to remove at least one component of a gas mixture, employing four basic process steps: (1) adsorption, (2) depressurization, (3) purge and, (4) repressurization. The gas mixture containing the more readily adsorbable component and a less readily adsorbable component is passed through at least one adsorbent bed capable of selectively adsorbing the more readily adsorbable component at a predetermined (upper) adsorption pressure. The gas stream exiting the bed at this upper pressure is now concentrated in the less readily adsorbable component, and is removed for example as product. When the bed becomes saturated with the readily adsorbable component, the bed is thereafter depressurized to a lower desorption pressure for the desorption of the readily adsorbable component, with this gas then discharged from the system. Some processes can include additional steps such as equalization and product pressurization.

Conventional PSA and VPSA processes employ rotary-type positive displacement blowers for either gas pressurization or evacuation in an adsorbent bed. These conventional rotary-lobe blowers typically have lower efficiencies and higher maintenance costs than centrifugal compressors, but they do adapt quite well to the oscillating nature of the pressure swing cycles. FIG. 1 shows an exemplary pressure history of a feed blower pressure demand for a VPSA cycle and FIG. 2 shows an exemplary pressure history of a vacuum blower pressure demand for a VPSA cycle. An attractive feature of rotary-lobe blowers pertaining to an adsorption process is that power consumption is proportional to system pressure requirements. The theoretical power consumption of the blower is directly proportional to the system pressure differential (i.e., has a linear relationship between power consumption and pressure). This linear power response to the system pressure requirements has made rotary-lobe blowers the compression equipment of choice for the PSA and VPSA industry. Rotary-lobe blowers, however, create strong pressure pulsations in the system. Without proper mitigation, pressure pulsations from rotary-lobe blowers are known to cause severe structural damage in downstream process equipment. Although pulsation damper vessels are normally used with rotary-lobe blowers, they do not eliminate the mismatch completely, and a considerable pressure pulsation level is always present in the system.

In the past, centrifugal compressors at fixed speeds with and without inlet guide vanes (IGVs) and with a variable-frequency drive (VFD) have been considered for PSA and VPSA processes because of their higher efficiency when compared to conventional rotary-lobe blowers. FIG. 3 illustrates a typical conventional centrifugal compressor system arrangement. A gearbox 10 with a lube oil system 11 is typically needed to convert the low speed of the induction motor (IM) 12 to the high speed of the centrifugal compressor 1, and the centrifugal compressor needs to run at high speeds for high efficiency. To most effectively use centrifugal compressors in highly dynamic pressure swing cycles, it is necessary to employ IGVs, variable-speed control or a combination of the two. As the PSA or VPSA cycle pressure deviates from the design pressure condition of a fixed-speed centrifugal compressor, the stage efficiency deteriorates substantially, especially when operating at pressure ratios close to 1 (choking). This results in increased average power consumption and a deterioration of the overall average compressor efficiency over the PSA or VPSA cycle. By continuously varying the compressor speeds, however, to match the head requirement of both the pressurizing and evacuating of the adsorbent beds, the compressors can theoretically be operated at their peak efficiencies from 100% design speed to a substantially lower speed. The power consumption now becomes very small, and hence, the average power economy and the overall cycle efficiency is improved dramatically relative to the use of rotary-lobe blowers.

Still, this technology could not be successfully employed in the past. The use of conventional fixed-speed centrifugal compressors with and without IGVs is not ideal because of their limited operating range. A conventional variable-speed centrifugal compressor can have an improved operating range and improved energy savings over the use of IGVs with a reduction in flow, but is unable to rapidly adapt to the transient flow conditions of the PSA or VPSA cycle (due to the large inertias of the gears and large slow running IM rotor).

Centrifugal compressors at fixed speeds with and without IGVs and with a VFD have previously been considered for PSA and VPSA processes. A. Abdelwahab, "Design of A Moderate Speed-High Capacity Centrifugal Compressor with Application to PSA And VPSA Air Separation Processes", Proceedings of PWR2005 ASME Power, Apr. 5-7, 2005, discusses the fundamentals of a VPSA cycle that makes use of moderate speed direct coupled centrifugal compressors with inlet guide vanes.

Several advances to PSA and VPSA processes have taken place in recent years. Some of these advances include: (a) a significant reduction in the ratio of the top adsorption to bottom desorption pressures, and (b) reductions in the cycle time (typically less than one minute) leading to reduced adsorbent inventories. A significant factor to the total energy requirement of a PSA or VPSA process is this ratio of adsorption to desorption pressures. The delivery pressure during the adsorption period of a bed by the feed air compression device, as well as the suction pressure during the desorption period by an evacuation device, is constantly changing as the cycle progresses. In order to achieve the lowest possible total power consumption for a cycle such as this, it is desirable for the feed compression and evacuation devices to be operated at peak efficiency over a wide range of pressure ratios.

The present invention relates to the application of newly designed high-speed induction motors with variable-speed operation to newly designed pressure/vacuum type adsorption systems with more advanced designs including faster cycle times and reduced power consumption.

SUMMARY OF THE INVENTION

The present invention relates to the application of high-speed induction motors designed for variable-speed operation used in adsorption systems, such as PSA or VPSA systems. Designs incorporating such motors can operate at optimal efficiency by allowing for the acceleration or deceleration of system apparatus at rates equal to or exceeding the cycle times (e.g., 35 seconds or less) of current newer PSA and VPSA systems and processes. The present invention more particularly relates to gas separation processes and systems such as PSA or VPSA adsorption systems having at least one vessel containing at least one adsorbent bed therein. The adsorbent bed includes at least one adsorbent material. In some embodiments, at least one adsorbent bed is cyclically pressurized by at least one feed compressor and sometimes evacuated by at least one vacuum compressor, with at least one of the at least one feed compressor or the at least one vacuum compressor being a centrifugal compressor driven by an associated high-speed induction motor designed for variable high-speed operation. In such embodiments, the compressor that is not a centrifugal compressor can be a rotary-lobe blower driven by the induction motor. In some embodiments of the present invention, the adsorbent bed is cyclically pressurized by at least one feed centrifugal compressor driven by an associated high-speed induction variable-speed motor and, evacuated by at least one vacuum centrifugal compressor driven by an associated high-speed induction variable-speed motor. More specifically and in accordance with the present invention, the centrifugal feed compressor(s) and/or centrifugal vacuum compressor(s) are driven by direct drive high-speed induction motors for variable-speed operation such that the compressor and high-speed induction motor combination(s) can accelerate from low-speed to high-speed and decelerate from high-speed to low-speed in rapid rates required by shorter cycle times of current PSA or VPSA systems and processes.

Use of variable-speed control high-speed induction motors in accordance with the present invention allows for an order of magnitude improvement over conventional low-speed induction motor/gearbox systems in their ability to accelerate and slow down the centrifugal compressor in a PSA or VPSA process. Using high-speed induction motors in accordance with the invention allows for the elimination of the necessity for gearboxes and thus likewise allows for the elimination of the necessity of lube oil systems. The centrifugal compressor(s) can thus be supported on oil free bearings. Furthermore, in some embodiments, the proposed drive systems of the present invention are expected to be more efficient by over 7 percentage points with the elimination of gear and bearing oil friction losses, lube oil system losses, and an improved ability to lead/lag power.

In preferred embodiments of the invention and as discussed herein, the compressors are operated along a best efficiency line. The best efficiency line is a line drawn on a compressor performance map. As discussed herein, a compressor performance map (pressure ratio vs. mass flow/mass flow$_{design}$ at various speeds) is generated from the isentropic work coefficient at various speeds for a specific inlet temperature to the compressor. The best efficiency line represents the loci of points that correspond to all the peak efficiency points of the compressor operating curves at different speeds and process conditions (compressor inlet pressure, compressor discharge pressure and compressor inlet temperature). By operating along the best efficiency line, the compressor(s) can be operated at its most efficient mode in terms of power consumption. The performance map(s) can also be in the form of lookup or reference tables generated from the isentropic work coefficient. The performance maps and resulting best efficiency lines can be stored in a programmable logic controller (PLC) and integrated with the PSA and VPSA systems.

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION

Figure 1:
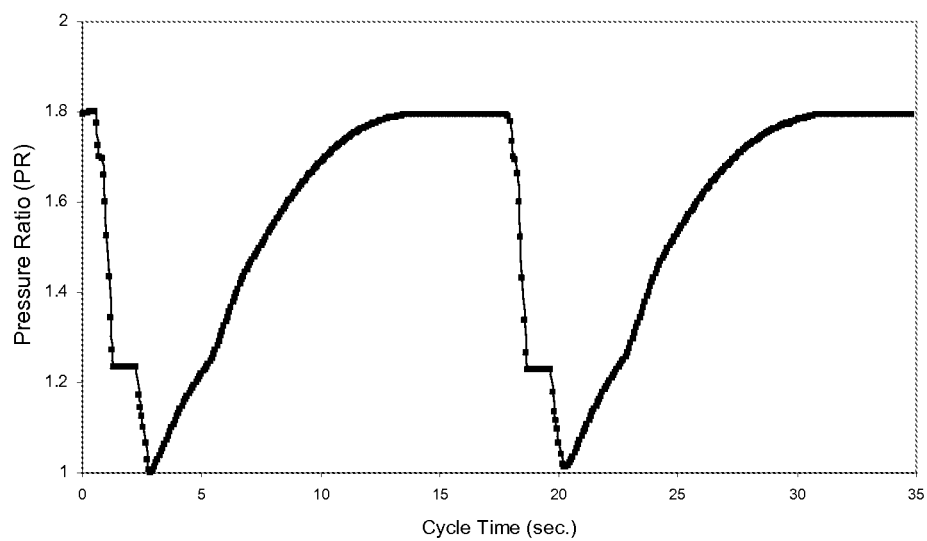
FIG. 1 is a graphical representation of an exemplary pressure history of a feed blower pressure demand for a VPSA cycle.
Figure 2:
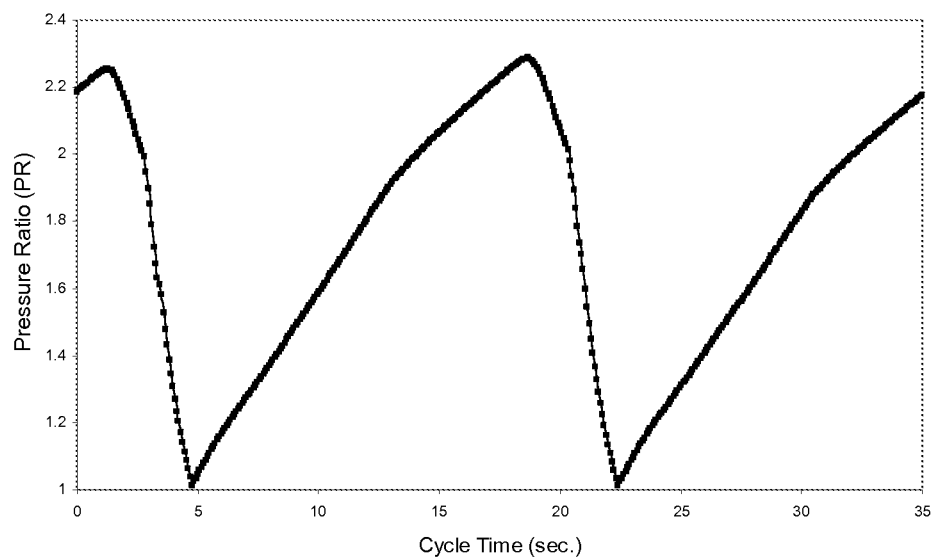
FIG. 2 is a graphical representation of an exemplary pressure history of a vacuum blower pressure demand for a VPSA cycle.

As mentioned above, the present invention relates to the use of high speed IMs in pressure/vacuum type adsorption systems such as PSA or VPSA systems. Advances in the design of high-speed IMs in recent years allow for the direct drive of centrifugal compressors and for application in PSA or VPSA systems. Some of the key developments include: (a) employment of various strategies to limit the rotor $I^2R$ losses, (b) solving the problem of thermal rotor bar growth, while maintaining rotor dynamic stability at the high speeds, (c) designing rotors that can withstand stresses and fatigue at high speeds, (d) designing an efficient motor cooling system that allows for compact size and maximum utilization of materials, and (e) incorporation of active magnetic bearings that take advantage of high-speed digital electronics to enhance dynamic stability while further reducing losses.

As used herein, "high-speed" with reference to induction motors refers to IMs capable of operating at speeds greater than 3600 RPM (i.e., 2-pole synchronous induction motor case with an AC line frequency of 60 Hz), preferably between 3600 and 15,000 RPM, designed for variable-speed operation. The actual design and speed of such high-speed IMs could vary depending on the systems and processes in which the IMs are to be implemented. Preferably, the IM will be operating at design speeds above 5000 RPM.

The present invention is directed to PSA or VPSA pressure/vacuum adsorption systems having at least one vessel containing at least one adsorbent bed therein. The adsorbent bed includes at least one adsorbent material. In some embodiments, the at least one adsorbent bed is cyclically pressurized by at least one feed compressor and sometimes evacuated by at least one vacuum compressor, with at least one of the at least one feed compressor or the at least one vacuum compressor being a centrifugal compressor driven by at least one associated high-speed IM designed for variable speed operation. In such embodiments, the compressor that is not a centrifugal compressor can be a rotary-lobe blower driven by an IM. In some embodiments of the present invention, the at least one adsorbent bed is cyclically pressurized by at least one feed centrifugal compressor driven by an associated high-speed IM and, evacuated by at least one vacuum centrifugal compressor driven by an associated high-speed IM. More specifically and in accordance with the present invention, the centrifugal feed compressor(s) and/or centrifugal vacuum compressor(s) are driven by an associated direct drive high-speed IM(s) designed for variable-speed operation such that the compressor and IM combination(s) can accelerate from low-speed to high-speed and decelerate from high-speed to low-speed in rapid rates required by short cycle times (e.g., about 35 seconds or less) of current PSA or VPSA systems and processes. The arrangements of the present invention thus allow for the compressors to be responsive to the unique short cycle time characteristics required by PSA and VPSA systems and processes.

As also discussed above, use of high-speed IMs with variable speed operation in accordance with the present invention allows for an order of magnitude improvement over conventional low-speed induction motor/gearbox systems in their ability to accelerate and slow down a centrifugal compressor in a PSA or VPSA process. Using IMs in accordance with the invention allows for the elimination of the necessity for gearboxes and thus likewise allows for the elimination of the necessity of lube oil systems. The centrifugal compressor(s) can thus be supported on oil free bearings.

While not to be construed as limiting, the present invention is implemented in PSA or VPSA adsorption processes that separate gases, such as air into oxygen and nitrogen. Other gas separations processes that can benefit from the use of the compressor-IM combinations of the present invention include, but are not limited to, PSA and VPSA separations involving the recovery of gases such as $O_2$, $N_2$, $CO_2$, $H_2$ or He.

Figure 3:
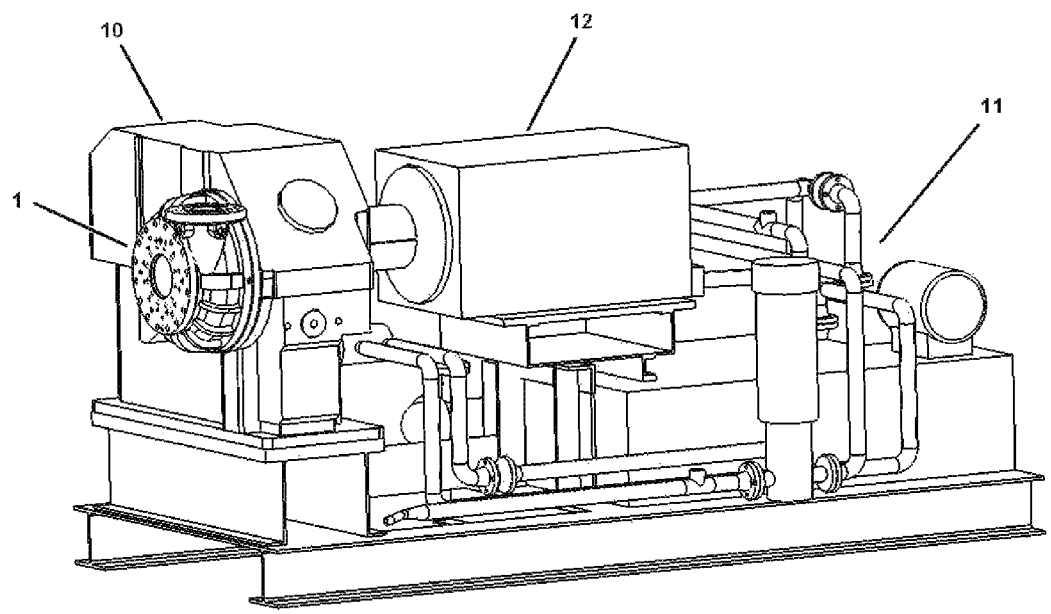
FIG. 3 is a schematic illustrating a centrifugal compressor with a gear box and induction motor.
Figure 4:
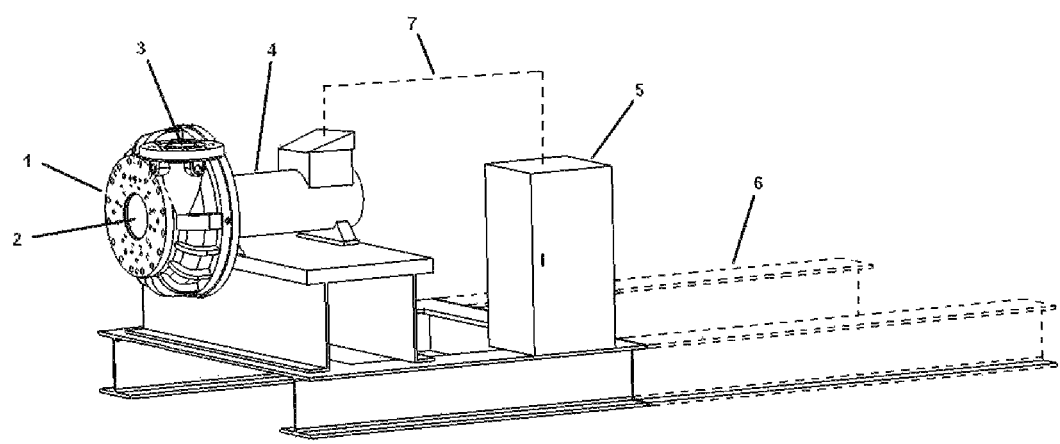
FIG. 4 is a schematic illustrating a centrifugal compressor with a directly driven high-speed induction variable-speed motor in accordance with the present invention.

An exemplary compressor-direct drive high speed IM arrangement suitable for use in accordance with this invention is shown in FIG. 4. Such arrangement can allow for the use of centrifugal compressor stages into PSA or VPSA cycles. More specifically, FIG. 4 shows a centrifugal compressor 1 with inlet opening 2 and outlet opening 3, leading to or from the PSA or VPSA system. As further shown in FIG. 4, the centrifugal compressor 1 is attached to a high-speed IM 4 designed for variable-speed operation, which is electrically connected to a variable-frequency drive (VFD) 5 via line 7. Reference line 6 in FIG. 4 represents the area of the FIG. 3 skid that would no longer be required due primarily to the elimination of the lube oil system and use of a high-speed IM that is smaller in size relative to a low-speed a conventional motors.

Motor 4 can be a high-speed IM designed for variable-speed operation. Such motors are commercially available with operational speeds up to about 20,000 RPM. The size of the IMs used in the invention will vary depending on the type of process and system requirements. The type of centrifugal machine is not to be construed as limiting. Centrifugal compressor 1 can be selected from any centrifugal compressor capable of operating at the required conditions of the system and process. VFDs are known and are systems for controlling the rotational speed of an alternating current (AC) electric motor by controlling the frequency of the electrical power supplied to the motor.

The use of high-speed IMs to drive centrifugal compressors can offer an order of magnitude improvement over the conventional low-speed induction motor/gearbox system in its ability to accelerate and slow down a centrifugal compressor in a PSA or VPSA process. Furthermore, the drive systems of the present invention are expected to be more efficient by over 7 percentage points with the elimination of gear and bearing oil friction losses, lube oil system losses, and an improved ability to lead/lag power In one hypothetical example, the following conclusions were made when evaluating a 16" compressor wheel with a 1250 HP drive system when driven by a conventional low-speed induction motor-gear box arrangement versus a high-speed IM: (1) the rotor polar mass moment of inertia of a high-speed IM is about $\frac{1}{6}$ that of a low-speed IM; (2) the rotor inertia of a high-speed IM motor is more than an order of magnitude lower than that of an low-speed IM plus its associated gear box (GB) system; (3) the high-speed IM motor and compressor system can accelerate from 40% speed to full design speed in about 2 seconds, whereas the low-speed IM, GB and compressor system takes an order of magnitude more time (about 31 seconds, due to the significant inertia difference between the systems); and (4) regarding deceleration, the high-speed IM motor and compressor system can go from full design speed to 40% speed in 2 seconds. In this case, the peak braking power is expected to be same as the rated motor power.

If the deceleration needs to be faster, then either dynamic braking (energy is fed to a braking resistor) or regenerative braking (energy is fed back into the power grid) can be obtained with variable-frequency drives on applications requiring rapid stops. This concept of dynamic or regenerative braking that is feasible for a high-speed IM motor system is not feasible with a low-speed IM system with a GB due to the large inertias of the gears and large slow running IM rotor. The rapid deceleration needed for the short cycle times of current PSA and VPSA systems cannot therefore be accomplished when using a geared centrifugal compressor with a VFD and low-speed IM.

Figure 5:
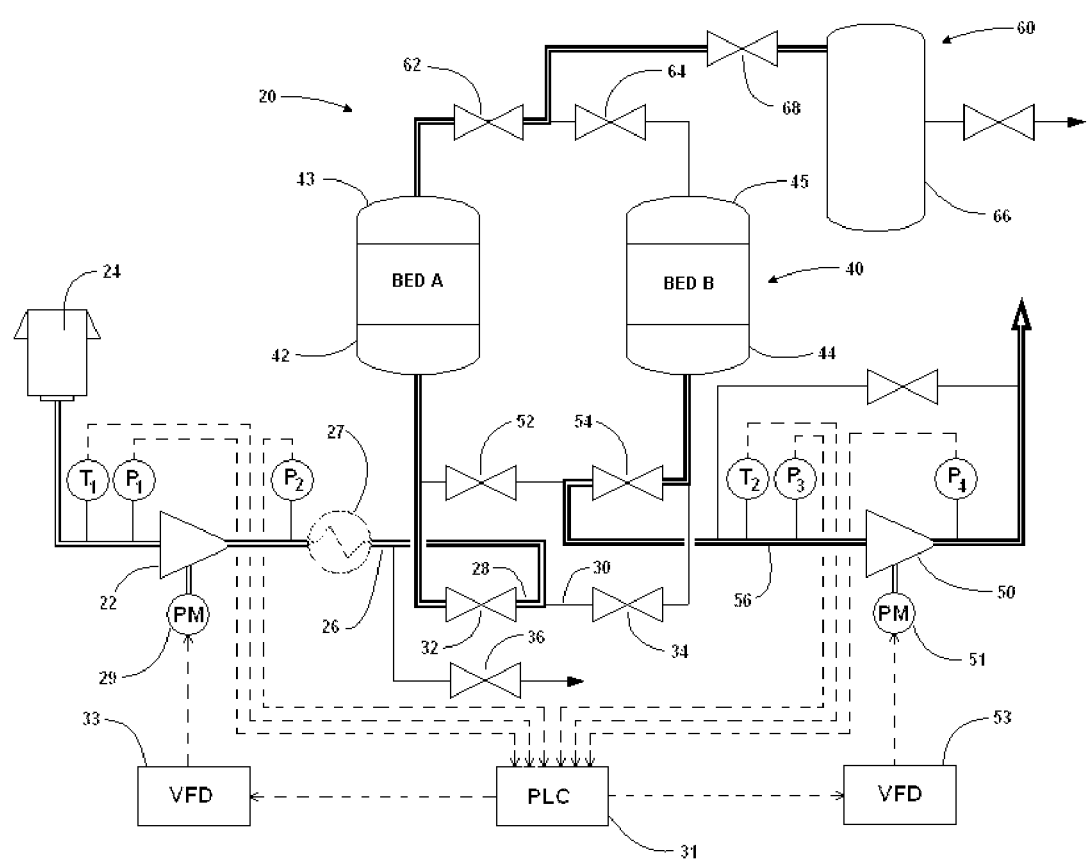
FIG. 5 is a schematic illustrating a VPSA system with direct drive high speed induction motors designed for variable speed operation and centrifugal compressors in accordance with one embodiment of the present invention.

Referring now to FIG. 5, a VPSA system according to one embodiment of the present invention is illustrated. System 20 shown in FIG. 5 includes a feed compressor 22, an adsorbent bed unit 40, and a single stage vacuum compressor 50 to efficiently produce a less selectively adsorbed gas (for example, oxygen from air). At least one of the feed compressor 22 and the vacuum compressor 50 is a centrifugal compressor directly driven by a high-speed IM. In preferred embodiments, both the feed compressor 22 and the vacuum compressor 50 are directly driven by high-speed IMs with variable speed operation as described herein. It should be appreciated, however, that in some embodiments, only one of the feed compressor 22 or the vacuum compressor 50 may be directly driven by a high-speed IM. Those skilled in the art should also appreciate that for PSA systems, the vacuum blower or compressor is not utilized as in a VPSA system.

Referring again to FIG. 5, feed compressor 22 includes a single-stage centrifugal compressor, directly driven (i.e. no gear box) by a high-speed IM 29, having an inlet 24 for drawing a gas such as air and directing a pressurized airflow through a feed air aftercooler 27 and then through a discharge manifold 26 to respective parallel inlet lines 28, 30.

Respective first and second pressurizing control valves 32, 34 are plumbed in the distal ends of the respective lines to selectively pressurize respective portions of the adsorbent bed unit 40. A vent valve 36 connects to an intermediate portion of the manifold 26 to selectively bypass airflow away from the bed unit. The valves are sequenced through a programmable logic controller (PLC) 31 according to timing corresponding to the process steps for the method of the present invention.

Referring again to FIG. 5, the adsorbent bed unit 40 comprises a dual adsorbent bed system, with bed A and bed B having respective bottom portions 42, 44 disposed downstream of the respective first and second pressurizing control valves 32, 34 in an alternating parallel arrangement. Respective top portions 43, 45 provide a convenient interface for connecting a product supply mechanism 60 comprising a single product surge tank 66. As mentioned above, alternative systems in accordance with the present invention could employ one adsorbent bed or more than two adsorbent beds.

Each adsorbent bed is contained in a vessel, preferably of the radial flow type. Radial flow vessels are known and include an enlarged feed end of overall asymmetric cross-section of the gas flow. Radial flow vessels accommodate large gas flow ranges and provide only a low pressure drop (Dp) across the bed in the direction of gas flow. Radial flow vessels also provide a more uniform flow distribution with the bed and typically offer a restrained adsorbent bed with an enlarged inlet area. It should be noted, however, that alternative flow vessels such as axial or horizontal beds can be used in the present invention.

The vacuum compressor 50 is plumbed to respective first and second depressurizing control valves 52, 54 that connect to a vacuum manifold 56. The valves are plumbed in parallel opposing relationship to the first and second pressurizing control valves 32, 34. Like the pressurizing valves, the depressurizing and vent valves are sequenced by the PLC 31. The manifold terminates in a single stage centrifugal vacuum compressor 50, directly driven by a high-speed IM 51 designed for variable-speed operation, for evacuating the respective beds A and B during predetermined cycle steps according to the method of the present invention.

As can be appreciated from FIG. 5, $P_1$ can remain constant (e.g., at ambient conditions) while $P_2$ will be responsive to conditions in the adsorbent beds ($P_2$ can vary or remain constant during pressurization, depressurization and during product make). As $P_2$ varies, the ratio of $P_2/P_1$ will likewise vary. Similarly, $P_4$ can remain constant (e.g., at ambient conditions) while $P_3$ will be responsive to conditions in the adsorbent beds ($P_3$ can vary or remain during pressurization, depressurization and during product make steps). As $P_3$ varies, the ratio of $P_4/P_3$ can likewise vary. Thus, the pressure ratios for the feed and vacuum compressors can vary or remain constant based on the conditions in the bed(s). Feedback to the PLC 31 regarding the pressure ratios can allow for the compressor operating speed to be adjusted appropriately. Accordingly, by continuously varying the compressor speeds to match the head requirement (i.e., the pressure ratio (PR), which is varying because of the pressurizing and evacuating adsorbent beds) of the pressurizing and evacuating adsorbent beds, the compressors can be operated near, and preferably at, their peak efficiencies from 100% design speed to a substantially lower speed. This can be accomplished using the information, calculations and performance maps which are stored in (i.e. hard-coded) the PLC, which then sends a signal to the VFD and associated high-speed IM with variable-speed operation. It will be appreciated that in the exemplary VPSA system for oxygen production shown in FIG. 5, $P_4$ and $P_1$ could be at or near ambient conditions.

With continued reference to FIG. 5, the product supply mechanism 60 includes respective first and second product outlet valves 62, 64 disposed at the top of the respective top portions 43, 45 of beds A and B to direct product (e.g., oxygen) flow from each bed to purge the other bed, equalize the pressure in the other bed, or flow to surge tank 66 for storage. An isolation valve 68 interposed between the surge tank 66 and the outlet valves 62, 64 cooperates with the outlet valves 62, 64 according to sequencing commands from the controller to effect the purge and/or equalization procedures.

A detailed description of the VPSA system for that shown in FIG. 5 is disclosed in U.S. Pat. No. 6,010,555 to Smolarek et al, the entire contents of which are incorporated herein by reference. In the present invention, however, at least one or both of the rotary-lobe blower arrangements described in U.S. Pat. No. 6,010,555 is replaced with higher efficiency centrifugal machine(s), directly driven by a high-speed IM designed for variable-speed operation. Preferably, both of the rotary-lobe blowers described in U.S. Pat. No. 6,010,555 are replaced with higher efficiency centrifugal machine(s), with each being directly driven by a high-speed IM. While the process conditions described in U.S. Pat. No. 6,010,555 can remain similar to the present invention, the centrifugal compressor mode of operation is quite different and is explained below.

The arrangement shown in FIG. 5 is intended to be exemplary and various other arrangements (such as one vessel or more than two vessels) could be implemented in accordance with the present invention. For example and while not to be construed as limiting, other systems in which the compressor-IM arrangements of the invention can be used include those such as described in U.S. Pat. No. 5,656,068 to Smolarek et al., U.S. Patent Application Publication No. 2007/0095208 A1 to Baksh et al., and U.S. Patent Application Publication No. U.S. 2008/0006151 A1 to Baksh et al. Other alternative PSA or VPSA arrangements could also be used according to the present invention.

Figure 6A:
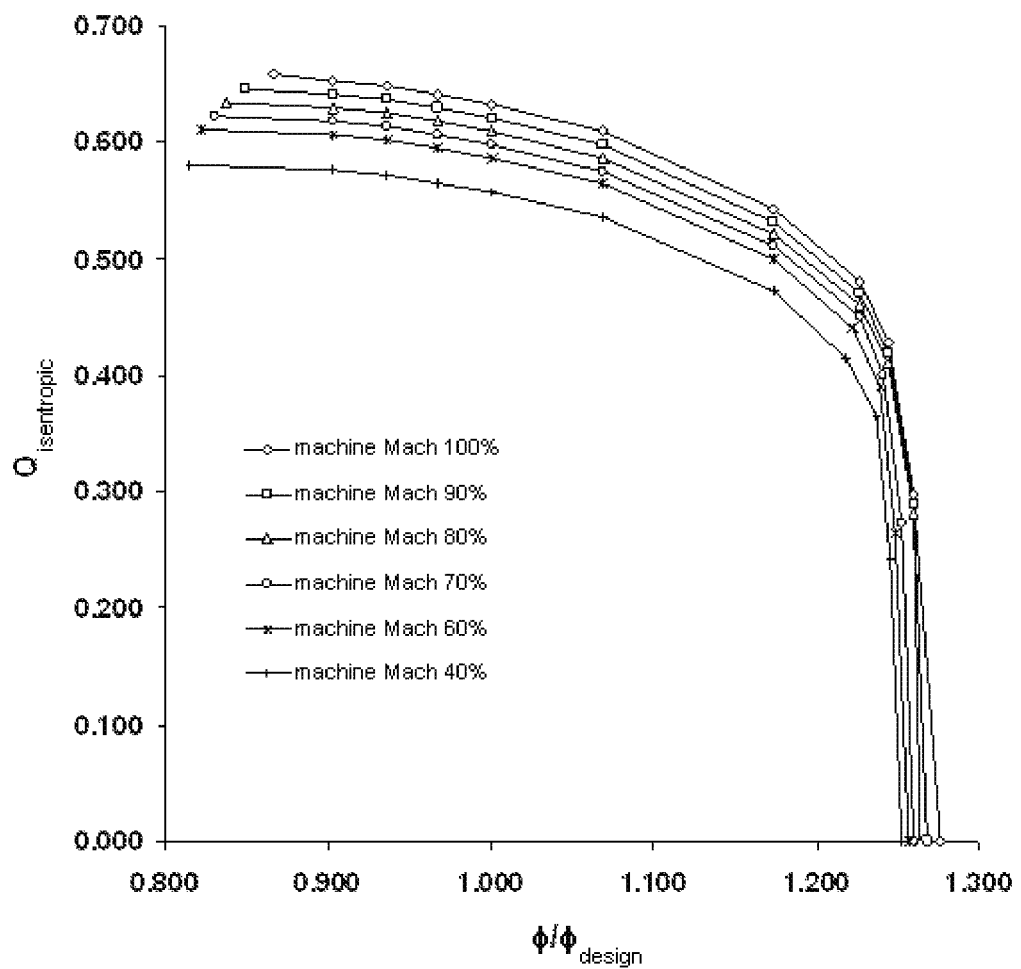
FIG. 6A is a graphical representation of exemplary compressor isentropic work coefficient vs. flow coefficient ratio ($\phi/\phi_{design}$) curves at different compressor Mach numbers.

Referring now to FIG. 6A, exemplary single stage centrifugal compressor isentropic work coefficient versus flow coefficient ratio ($\phi/\phi_{design}$) curves for an ideal gas at different machine Mach Numbers are shown. This isentropic work coefficient, $Q_{isentropic}$, is a dimensionless parameter and can be calculated as follows:

$$Q_{isentropic} = \frac{T_i C_p \left( PR^{\frac{\gamma-1}{\gamma}} - 1 \right)}{U_{tip}^2}; \quad \text{(equation 1)}$$

where $T_i$ is the inlet temperature, $C_p$ is the gas specific heat at constant pressure, $\gamma$ equals $C_p/C_v$ where $C_v$ is the gas specific heat at constant volume, PR is the stage pressure ratio, and $U_{tip}$ is the compressor impeller blade tip speed defined as:

$$U_{tip} = \frac{\pi D N}{60}; \quad \text{(equation 2)}$$

where N is the impeller blade rotational speed in RPM and D is the diameter of the impeller blade. The machine Mach Number, M, is a dimensionless parameter and is defined as:

$$M = \frac{U_{tip}}{\sqrt{\gamma R T_i}}; \quad \text{(equation 3)}$$

where R is the ideal gas law constant.

The flow coefficient, $\phi$, a dimensionless parameter, is defined as:

$$\phi = \frac{V_s}{2\pi N D^3}; \quad \text{(equation 4)}$$

where $V_s$ is the compressor suction volume flow rate, and all other terms are as defined above. Using compressor design information in equation 4 is used to determine $\phi_{design}$.

Figure 6B:
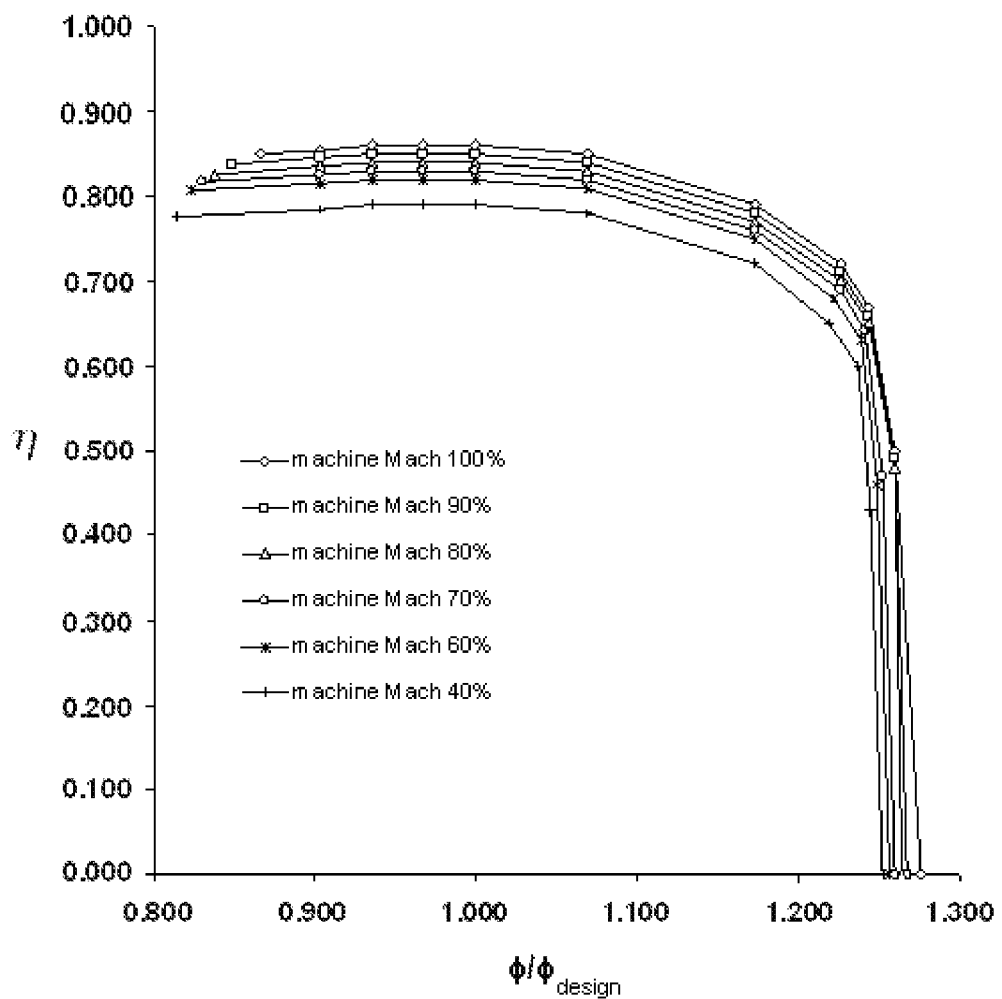
FIG. 6B is a graphical representation of exemplary compressor efficiency ($\eta$) vs. flow coefficient ratio ($\phi/\phi_{design}$) curves at different compressor Mach numbers obtained by experimental measurement of the compressor performance for the compressor used in FIG. 6A.

The compressor isentropic work coefficient ($Q_{isentropic}$) vs. flow coefficient ratio ($\phi/\phi_{design}$) curves at different speeds of FIG. 6A and efficiency ($\eta$) vs. flow coefficient ratio ($\phi/\phi_{design}$) curves at different speeds of FIG. 6B are obtained by experimental measurement of the compressor performance. It is understood that efficiency can be determined using industry standards. In order to illustrate how to use these curves to operate the compressor along its best efficiency line, a compressor performance map (pressure ratio vs. mass flow/mass flow$_{design}$ at various speeds) is first generated from the isentropic work coefficient at various speeds for a specific inlet temperature to the compressor.

Next, the best efficiency line is established on the compressor performance map using the information from FIG. 6B. It represents the loci of points that correspond to all the peak efficiency points of the compressor operating curves at different speeds and process conditions. By operating along this line, the compressor is being operated at its most efficient mode in terms of power consumption. Such performance maps, along with their resulting best efficiency lines, can be programmed (i.e., hard coded) in the PLC of the PSA or VPSA system in the form of a curve(s) or reference table(s).

Figure 7:
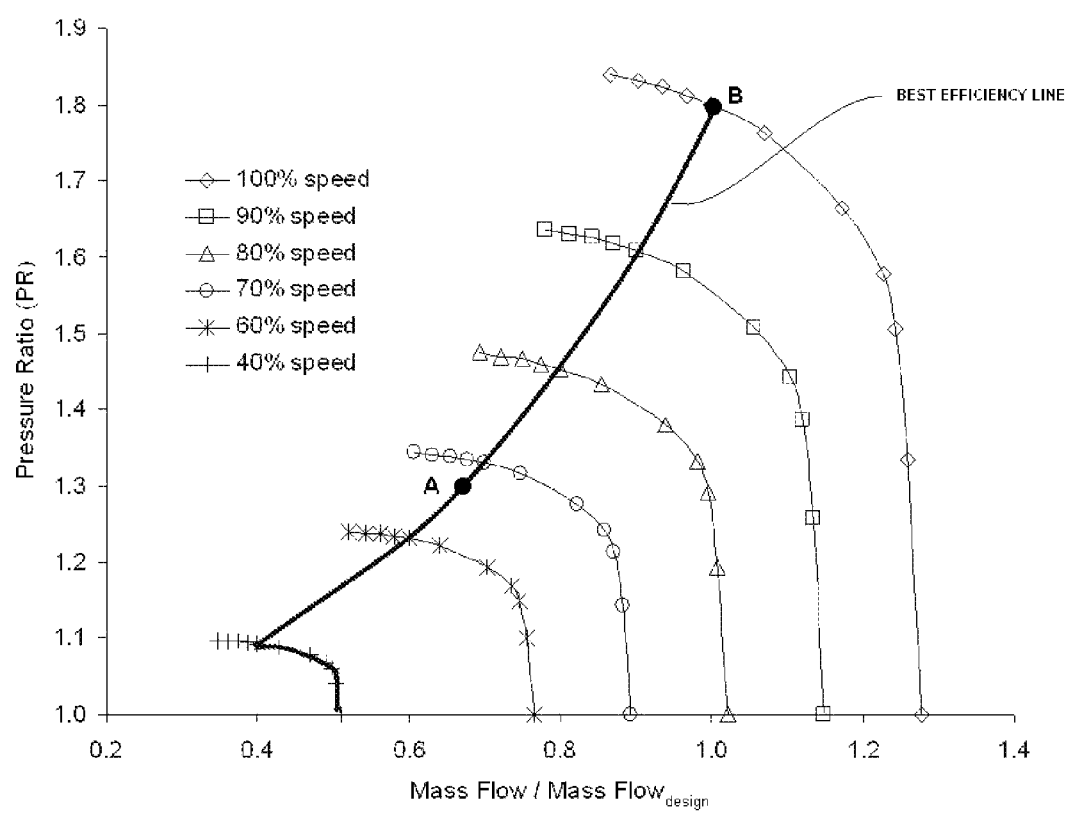
FIG. 7 is a graphical representation of an exemplary compressor performance map (pressure ratio (PR) vs. mass flow/mass flow$_{design}$ at various speeds) corresponding to a specific inlet temperature.

FIG. 7 is a graphical representation of an exemplary compressor performance map that corresponds to a specific inlet temperature (e.g., 70° F.). A family of performance maps, such as shown in FIG. 7, would be generated for temperatures that a compressor might see at its inlet (based on variable ambient conditions for the feed compressor and variable adsorbent bed temperatures for the vacuum compressor). Similar performance maps could thus be generated for different inlet temperatures. By monitoring the compressor inlet pressure and temperature and discharge pressure, the appropriate performance map could be used to identify the compressor speed necessary to operate along its best efficiency line. There are regions, however, away from the best efficiency line of the performance map where its efficiency is substantially lower than a rotary-lobe blower. In order to achieve superior efficiency relative to a rotary-lobe blower, it is therefore important to operate the centrifugal compressor at or near its best efficiency line as determined above at all times.

Centrifugal compressors can theoretically be 15 points higher in efficiency over rotary-lobe blowers, but that is only if the machine speed is controlled to substantially match (i.e., be at or near) the head requirement (i.e., follow the PSA or VPSA cycle and run on its best efficiency for any give point in time). Thus, the use of high-speed IMs for variable speed operation with centrifugal compressors according to the present invention provides for systems and processes that are not only capable of responding to the short cycle times of current PSA and VPSA systems and processes; such arrangements also allow for significantly improved process efficiencies with regard to prior art rotary-lobe blower arrangements. The following Examples 1 and 2 are hypothetical examples and are intended to be illustrative of the invention.

Example 1

Figure 8:
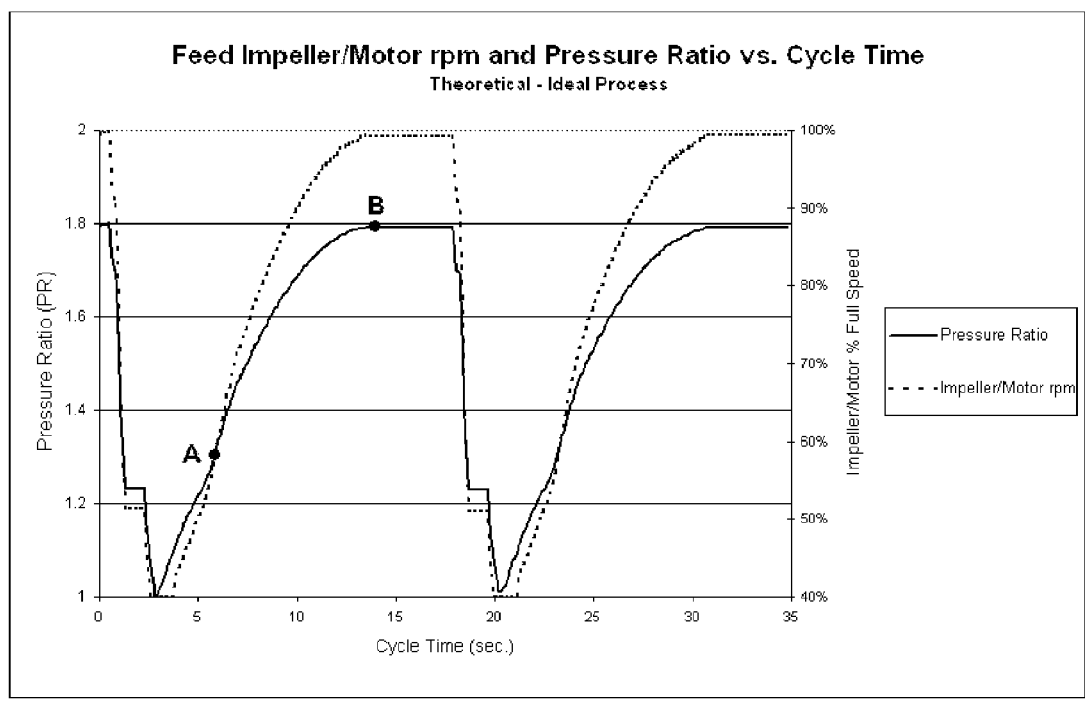
FIG. 8 is a graphical representation of an exemplary theoretical-ideal feed compressor response over a typical VPSA cycle.

FIG. 8 is a graphical representation of an exemplary ideal feed compressor response over a typical VPSA cycle. With reference again to FIG. 5 and to FIG. 8 for example, at any instant in time during a VPSA cycle, temperature $T_1$ pressures $P_1$ and $P_2$, temperature $T_2$, and pressures $P_3$ and $P_4$ are measured via a typical pressure transducer or transmitter and recorded in the plant PLC 31. Specifically and for purposes of illustration, looking at the feed compressor 22 during a rising pressure feed step (point A on FIG. 8), the control system calculates the pressure ratio (PR) across the feed machine by dividing $P_2$ over $P_1$. Using this calculated pressure ratio and inlet temperature $T_1$, the control system PLC 31 then determines the motor/compressor operating speed using the compressor performance map and resulting best efficiency line that was generated for $T_1$ as illustrated at point A (in this case, the motor/compressor operating speed is approximately 67% full speed) on FIG. 7. This information is then communicated to VFD 33 to direct compressor 22 and motor 29 to operate at such speed. Similar determinations and communications are likewise accomplished with respect to centrifugal vacuum compressor 50 and high-speed IM 51.

Example 2

During a constant pressure feed with product make step (see for example point B on FIG. 8), inlet temperature $T_1$ and updated pressure ratio across the feed machine obtained by dividing $P_2$ over $P_1$ serve as inputs to determine the motor/compressor operating speed using the compressor performance map and resulting best efficiency line that was generated for the updated $T_1$ as illustrated at point B (100% full speed) on FIG. 7. This information is then communicated to VFD 33 to direct compressor 22 and motor 29 to operate at such speed. Similar determinations and communications are likewise accomplished with respect to centrifugal vacuum compressor 50 and high-speed IM 51.

In general, the pressure ratio across the compressor fluctuates in response to system pressure changes (such as occurs during pressuriziation and evacuation of the adsorbent bed(s)). The speed of the compressor is continuously varied from 100% design speed to a substantially lower speed (e.g., 40% is the typical low end for aerodynamic conditions) so that it operates at its best efficiency point for any given pressure ratio and inlet temperature. The resulting compressor flow rate is a response dictated by the best efficiency curve. A series of experimentally determined best efficiency lines generated for various inlet temperatures could be programmed (i.e. hard coded) into the PLC 31. As also mentioned above, such information can also be programmed into PLC 31 in the form of reference tables.

Figure 9:
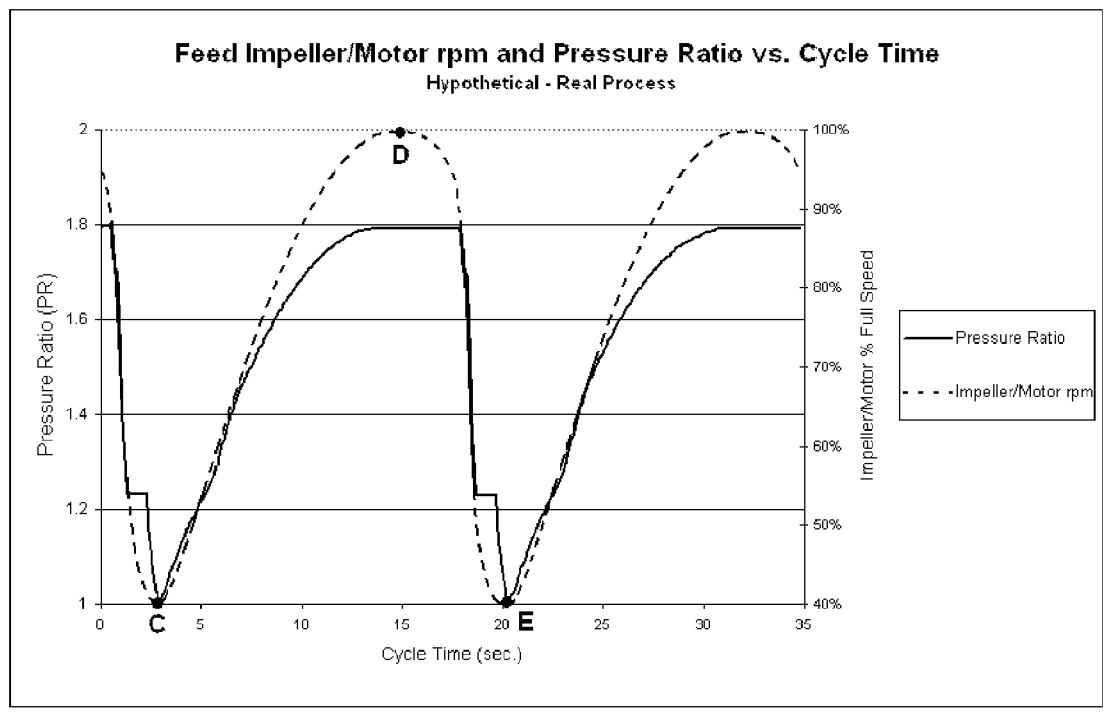
FIG. 9 is graphical representation of an exemplary hypothetical-real feed compressor response over a typical VPSA cycle.

During plant operation, the PLC 31 continuously monitors the inlet temperature, calculates the pressure ratio across the compressor, selects the appropriate operating speed from the best efficiency line that corresponds to the inlet temperature, and finally sends a signal to the VFD 33, which communicates to its respective high-speed IM 29 and feed centrifugal compressor 22. Both theoretical-ideal and hypothetical-real (i.e., practically achievable) feed machine speed and pressure ratio over a typical entire VPSA cycle are respectively illustrated in FIGS. 8 and 9. It is noted that FIG. 9 is for a hypothetical real process. In a simultaneous manner, PLC 31 could use the inlet temperature $T_2$ and pressures $P_3$ and $P_4$ to determine the optimum vacuum compressor speed using its own best efficiency lines or reference table(s) programmed in the PLC 31. As with the feed machine, PLC 31 could send a separate signal to the VFD 53, and the VFD 53 could then communicate to its respective high-speed IM 51 and vacuum centrifugal compressor 50.

Typically at very low speeds, the surge margin of a centrifugal compressor is greatly reduced. In order to avoid operational problems, the lowest speed of the compressor is therefore preferably kept at a reasonable percentage of the design speed, in this particular case 40% design speed. Once the compressor reaches this speed, the motor speed is fixed and the compressor operates along its particular speed characteristic curve (e.g., between pressure ratios of 1.0 and 1.1 as shown in FIG. 7).

Compressors directly driven by high-speed IMs designed for variable-speed operation eliminate the large inertia (e.g. gears and large slow running IM rotor) components in the compressor-motor systems and allow for the adequate response (e.g., the feed compressor can respond to the profile as illustrated for example in FIGS. 8 and/or 9) of the compressor to the PSA or VPSA cycle requirements. More particularly, the arrangements of the present invention thus allow for the compressors to be responsive to the short cycle time characteristics of current PSA and VPSA systems and processes. For a given horsepower, the rotary inertia of a high-speed IM is about ⅙ that of a comparable induction motor when either is used to drive a centrifugal compressor.

With continued reference to FIG. 9, the acceleration and deceleration rate of the motor (i.e., between 100% and 40% full speed) is on the order of 11 seconds from points C to D and 6 seconds from points D to E, respectively. As mentioned hereinabove, machines such as centrifugal compressors driven by a conventional low-speed induction motor cannot accelerate or slow down at the rapid rates required by the short cycle times of PSA or VPSA systems (i.e., such machines are unable to rapidly adapt to the transient flow conditions of cycle—due to the large inertias of the gears and large slow running IM rotor). In contrast, the use of high-speed IMs to drive centrifugal compressors according to the present invention allows for such machines to be responsive to the short cycle times of current systems and cycle times.

An alternative way to practice this invention is to use a suction throttle valve in conjunction with the high-speed IM. Such a suction throttle valve could be implemented in a PSA or VPSA system for example between the feed compressor and inlet (e.g., upstream of feed compressor 22 and downstream of inlet 24 in FIG. 5). The suction throttle valve could be used at the lowest operating speed (i.e., 40% full speed for the same reason as stated above) to further reduce the compressor power consumption. This is done by reducing the inlet density, thus mass flow, to the compressor while operating at 40% of full speed.

Figure 10:
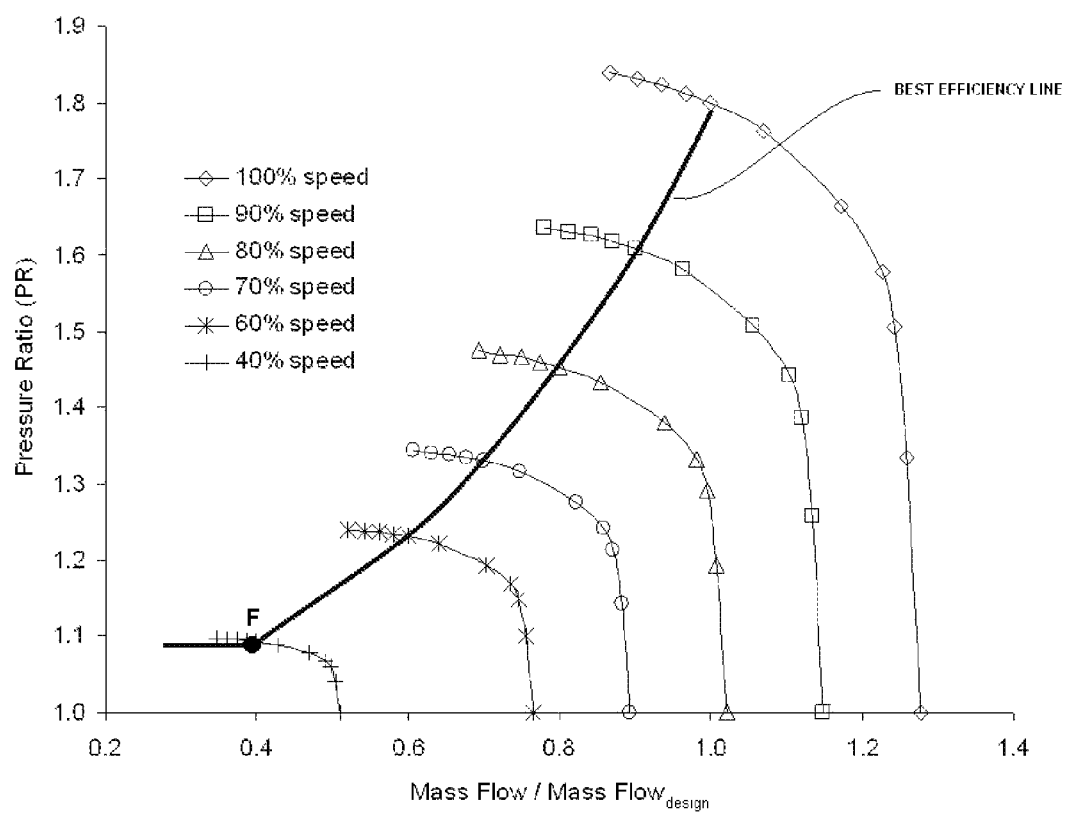
FIG. 10 is a graphical representation of an exemplary compressor performance map with suction throttle used at lowest speed line.

FIG. 10 is a graphical representation of an exemplary compressor performance map with suction throttle used at lowest speed line. For example, as shown at point F in FIG. 10, once a pressure ratio of approximately 1.1 is reached, the suction throttle valve would begin to close by a pre-programmed amount in the PLC 31, resulting in an improved turndown operating range that has a lower power consumption than in the case without the suction throttle valve.

Another embodiment of the present invention includes a system using inlet guide vanes (IGV) on the centrifugal compressor(s) in conjunction with the high-speed motor. Inlet guide vanes can be used when capacity control of centrifugal compressors is desired. They are internal to the machine. The IGV can be used either at fixed speed or with varying compressor speed.

Although the invention has been described in detail with reference to certain preferred embodiments, those skilled in the art will recognize that there are other embodiments within the spirit and the scope of the claims.

What is claimed is:

1. An adsorption system for gas separation, comprising:
   at least one vessel containing at least one adsorption bed including at least one adsorption material;
   at least one feed centrifugal compressor configured to be driven by an associated motor comprising a direct drive high-speed induction motor designed for variable-speed operation; and
   means for receiving data signals for conditions in the system and for communicating to the high-speed induction motor driving the at least one feed centrifugal compressor in response to the conditions such that the at least one feed centrifugal compressor can operate at a designated speed; and
   wherein the at least one bed is configured for cyclical pressurization and depressurization during operation.

2. The system of claim 1, further comprising at least one second compressor driven by an associated motor, wherein the at least one second compressor is a rotary-lobe blower and the associated motor is an induction motor.

3. The system of claim 1, further comprising at least one vacuum compressor driven by an associated motor, wherein the at least one vacuum compressor is a rotary-lobe blower and the associated motor is an induction motor.

4. The system of claim 1, further comprising at least one vacuum centrifugal compressor and an associated high-speed induction motor.

5. The system of claim 4, further comprising at least one second vacuum compressor driven by an associated motor, wherein the at least one second vacuum compressor is a rotary-lobe blower and the associated motor is an induction motor.

6. The system of claim 4, wherein the associated motor of the at least one feed centrifugal compressor is in communication with at least one associated variable-frequency drive and the at least one associated variable-frequency drive is in communication with the means for receiving data signals and wherein the associated motor of the at least one vacuum centrifugal compressor is in communication with at least one associated variable-frequency drive and the at least one associated variable-frequency drive is in communication with the means for receiving data signals.

7. The system of claim 1, wherein the conditions in the system comprise inlet pressure and outlet pressure for the at least one feed centrifugal compressor and inlet temperature for the at least one feed centrifugal compressor.

8. The system of claim 7, wherein the means for receiving data signals is configured to determine the pressure ratio (outlet pressure/inlet pressure) for the at least one feed centrifugal compressor.

9. The system of claim 8, wherein the means for receiving data signals communicates during operation to the associated high-speed induction motor of the at least one feed centrifugal compressor a speed at which to operate in response to the pressure ratio and the inlet temperature for the at least one feed centrifugal compressor.

10. The system of claim 9, wherein the associated high-speed induction motor is directly coupled to the at least one feed centrifugal compressor such that the at least one feed centrifugal compressor can be operated at or near a predetermined efficiency line.

11. The system of claim 10, wherein the predetermined efficiency line is a best efficiency line represented by the loci of points that correspond to peak efficiency points of the compressor operating curves at different speeds and process conditions of the at least one feed centrifugal compressor.

12. The system of claim 1, wherein the system comprises a PSA or a VPSA system.

13. The system of claim 12, wherein the PSA or VPSA system comprises at least two adsorption vessels, each vessel containing at least one adsorption bed including at least one adsorption material therein.

14. The system of claim 12, wherein the PSA or VPSA system comprises a system for recovering at least one gas selected from the group comprising: $O_2$, $N_2$, $CO_2$, $H_2$ or helium.

15. The system of claim 1, wherein the at least one feed centrifugal compressor includes inlet guide vanes.

16. The system of claim 1, wherein the at least one high-speed induction motor is capable of operation at speeds of at least 3600 revolutions per minute.

17. The system of claim 1, wherein the at least one feed centrifugal compressor configured driven by the associated motor comprising a high-speed induction motor can accelerate from 40% speed to full design speed in about 2 seconds and decelerate from full design speed to 40% speed in about 2 seconds.

18. A system for gas separation, comprising:
at least one vessel containing at least one adsorption bed including at least one adsorption material;
at least one feed centrifugal compressor configured to be driven by an associated high-speed induction motor designed for variable-speed operation;
at least one vacuum centrifugal compressor configured to be driven by an associated direct drive high-speed induction motor designed for variable-speed operation; and
means for receiving data signals for conditions in the system and for communicating to the high-speed induction motor associated with the at least one feed centrifugal compressor in response to the conditions such that the at least one feed centrifugal compressor can operate at a designated speed and for communicating to the high-speed induction motor associated with the at least one vacuum centrifugal compressor in response to the conditions such that the at least one vacuum centrifugal compressor can operate at a designated speed; and
wherein the at least one vessel is configured for cyclical pressurization and depressurization during operation.

19. The system of claim 18, further comprising at least one second feed compressor driven by an associated motor, wherein the at least one second feed compressor is a rotary-lobe blower and the associated motor is an induction motor.

20. The system of claim 18 further comprising at least one second vacuum compressor driven by an associated motor, wherein the at least one second vacuum compressor is a rotary-lobe blower and the associated motor is an induction motor.

21. The system of claim 18, wherein the associated motor of the at least one feed centrifugal compressor is in communication with an associated variable-frequency drive and the associated variable-frequency drive is in communication with the means for receiving data signals and wherein the associated motor of the at least one vacuum centrifugal compressor is in communication with an associated variable-frequency drive and the vacuum variable-frequency drive is in communication with the means for receiving data signals.

22. The system of claim 18, wherein the conditions in the system comprise inlet pressure ($P_1$), outlet pressure ($P_2$) and inlet temperature for the at least one feed centrifugal compressor and wherein the conditions in the system comprise inlet pressure ($P_3$), outlet pressure ($P_4$) and inlet temperature for the at least one vacuum centrifugal compressor.

23. The system of claim 22, wherein the means for receiving data signals is configured to determine the pressure ratio ($P_2/P_1$) for the at least one feed centrifugal compressor and wherein the contra means for receiving data signals is configured to determine the pressure ratio ($P_4/P_3$) for the at least one vacuum centrifugal compressor.

24. The system of claim 23, wherein the means for receiving data signals communicates during operation to the high-speed induction motor associated with the at least one feed centrifugal compressor a speed at which to operate in response to the pressure ratio ($P_2/P_1$) and the inlet temperature for the at least one feed centrifugal compressor and wherein the means for receiving data signals communicates during operation to the high-speed induction motor associated with the at least one vacuum centrifugal compressor a speed at which to operate in response to the pressure ratio ($P_4/P_3$) and the inlet temperature for the at least one vacuum centrifugal compressor.

25. The system of claim 24, wherein the high-speed induction motor associated with the at least one feed centrifugal compressor is directly coupled to the at least one feed centrifugal feed compressor such that the at least one feed centrifugal compressor can be operated at a predetermined efficiency and wherein the high-speed induction motor associated with the at least one vacuum centrifugal compressor is directly coupled to the at least one vacuum centrifugal compressor such that the at least one vacuum centrifugal compressor can be operated along a predetermined efficiency line.

26. The system of claim 25, wherein the predetermined efficiency lines are best efficiency lines represented by a locus of points that correspond to peak efficiency points of the respective compressor operating curves at different speeds and process conditions of the respective at least one feed centrifugal compressor and at least one vacuum centrifugal compressor.

27. The system of claim 18, wherein the system comprises a VPSA system and each of the centrifugal compressors configured to be driven by an associated high-speed induction motor can accelerate from 40% speed to full design speed in about 2 seconds and decelerate from full design speed to 40% speed in about 2 seconds.

28. The system of claim 18, wherein the high-speed induction motors are capable of operation at speeds of at least 3600 revolutions per minute.

29. An adsorption process for gas separation, the process comprising:
  introducing a feed gas into at least one vessel containing at least one adsorbent bed including at least one adsorbent material, the feed gas comprising at least one less readily adsorbable component and at least more readily adsorbable component;
  passing the gas through the at least one adsorbent material such that the more readily adsorbable component is adsorbed by the at least one adsorbent material; and
  withdrawing a gas enriched in the less readily adsorbable component; and
  wherein the at least one adsorbent bed is cyclically pressurized and depressurized during the process with at least one centrifugal compressor directly driven by an associated high-speed induction motor designed for variable speed operation and further comprising monitoring the process using means for receiving data signals for conditions in the process and for communicating to the high-speed induction motor associated with the at least one centrifugal compressor in response to the conditions such that the at least one feed centrifugal compressor can operate at a designated speed.

30. The process of claim 29, wherein the conditions in the process comprise inlet pressure ($P_1$), outlet pressure ($P_2$) and inlet temperature for the at least one feed centrifugal compressor.

31. The process of claim 30, wherein the means for receiving data signals is configured to determine the pressure ratio ($P_2/P_1$) for the at least one centrifugal compressor.

32. The process of claim 31, wherein the means for receiving data signals communicates to the high-speed induction motor associated with the at least one centrifugal compressor a speed at which to operate in response to the pressure ratio ($P_2/P_1$) and the inlet temperature for the at least one centrifugal compressor.

33. The process of claim 32, wherein the high-speed induction motor associated with the at least one feed centrifugal compressor is directly coupled to the at least one feed centrifugal compressor such that the at least one centrifugal compressor can be operated along a predetermined efficiency line.

34. The process of claim 32, wherein the process comprises a PSA or a VPSA system.

35. The process of claim 34, wherein the PSA or VPSA process comprises at least two adsorption vessels, each vessel containing at least one adsorption bed including at least one adsorption material therein.

36. The process of claim 32, wherein the PSA or VPSA process comprises a process for recovering at least one gas selected from the group comprising: $O_2$, $N_2$, $CO_2$, $H_2$ or helium.

37. The process of claim 29, wherein the high-speed induction motor associated with the at least one centrifugal compressor is capable of operation at speeds of at least 3600 revolutions per minute and accelerate from 40% speed to full design speed in about 2 seconds and decelerate from full design speed to 40% speed in about 2 seconds.

38. The process of claim 29, wherein the means for receiving data signals is a programmable logic controller.

* * * * *